(12) United States Patent
Lee

(10) Patent No.: US 9,935,340 B2
(45) Date of Patent: Apr. 3, 2018

(54) BATTERY PACK

(71) Applicant: Samsung SDI Co., Ltd., Yongin-si, Gyeonggi-do (KR)

(72) Inventor: Ha-Neul Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/347,699

(22) Filed: Nov. 9, 2016

(65) Prior Publication Data

US 2017/0133726 A1   May 11, 2017

(30) Foreign Application Priority Data

Nov. 9, 2015   (KR) .................. 10-2015-0156725

(51) Int. Cl.
| | |
|---|---|
| *H01M 2/00* | (2006.01) |
| *H01M 10/42* | (2006.01) |
| *H01M 2/10* | (2006.01) |
| *H01M 2/20* | (2006.01) |

(52) U.S. Cl.
CPC ....... *H01M 10/425* (2013.01); *H01M 2/1016* (2013.01); *H01M 2/202* (2013.01)

(58) Field of Classification Search
CPC .................................................... H01M 2/00
See application file for complete search history.

(56) References Cited

U.S. PATENT DOCUMENTS

| | | | |
|---|---|---|---|
| 2009/0297892 A1* | 12/2009 | Ijaz .................. | H01M 2/105 |
| | | | 429/7 |
| 2011/0097619 A1 | 4/2011 | Park | |
| 2013/0316202 A1 | 11/2013 | Bang et al. | |

FOREIGN PATENT DOCUMENTS

| | | |
|---|---|---|
| KR | 10-1084836 B1 | 11/2011 |
| KR | 10-2013-0043338 A | 4/2013 |
| KR | 10-1299139 B1 | 8/2013 |

* cited by examiner

*Primary Examiner* — Jacob Marks
(74) *Attorney, Agent, or Firm* — Knobbe Martens Olson & Bear LLP

(57) ABSTRACT

A battery pack is disclosed. In one aspect, the battery pack includes rechargeable batteries each having first and second terminals opposing each other and first and second fixing members each having catching portions respectively positioned at opposite sides of the rechargeable batteries and extending toward a center of the rechargeable batteries. Each of the catching portions has first and second ends opposing each other, and a gap is formed between the catching portions and the rechargeable batteries. The battery pack also includes a plurality of balancing wires and a protective circuit configured to protect the rechargeable batteries from overcharge or overdischarge. The catching portions of the first fixing member and the respective catching portions of the second fixing member are engaged and fixed with respect to each other, and wherein one or more of the balancing wires pass through the gap.

20 Claims, 19 Drawing Sheets

BATTERY PACK

CROSS-REFERENCE TO RELATED APPLICATION

This application claims priority to and the benefit of Korean Patent Application No. 10-2015-0156725 filed in the Korean Intellectual Property Office on Nov. 9, 2015, the entire contents of which are incorporated herein by reference.

BACKGROUND

Field

The described technology generally relates to a battery pack.

Description of the Related Technology

Unlike a primary battery, a rechargeable battery can be repeatedly charged and discharged. Low-power rechargeable batteries are used in small portable electronic devices such as mobile phones, laptop computers, and camcorders, while high-power rechargeable batteries are widely used as a power source for an electric motor of a hybrid vehicle.

Recently, a high power rechargeable battery using a non-aqueous electrolyte and having high energy density has been developed. The high power battery includes a large-capacity battery pack in which a plurality of rechargeable batteries are connected, such as an electric vehicle or the like.

Such a battery pack includes an electrode tab for connecting the rechargeable batteries, and a balancing wire for connecting the electrode tab to a protective circuit board. In this case, the balancing wire is connected to the protective circuit board while being fixed to an end portion of the electrode tab.

The above information disclosed in this Background section is only to enhance the understanding of the background of the described technology, and therefore it can contain information that does not form the prior art that is already known in this country to a person of ordinary skill in the art.

SUMMARY OF CERTAIN INVENTIVE ASPECTS

One inventive aspect relates to a battery pack to which balancing wires are stably fixed without a separate fixing member.

Another aspect is a battery pack that includes: a plurality of rechargeable batteries; first and second fixing members respectively, each having a plurality of catching portions respectively positioned at opposite sides of the rechargeable batteries and extending toward a center of the rechargeable batteries; a lower connecting member overlapping the first fixing member and electrically coupling one terminals of the rechargeable batteries; an upper connecting member overlapping the second fixing member and electrically coupling the other terminals of the rechargeable batteries; a protective circuit for protecting the rechargeable batteries; and a plurality of balancing wires electrically coupling the lower and upper connecting members to the protective circuit. One ends of the catching portions are engaged and fixed with respect to each other, and one or more balancing wires pass through a gap between the catching portions and the rechargeable batteries.

The first and second fixing members can respectively have a body that has a plurality of insertion holes into which one sides of the rechargeable batteries are inserted, and the catching portions can be extended from inner side walls of the holes formed in the bodies.

The catching portion can include a recess portion that is formed in a length direction of the rechargeable batteries.

The connecting portion to which the connecting member and the balancing wire are connected can be positioned in the recess portion.

One end of the catching portion can have a protruding portion that protrudes in a direction perpendicular to a length direction of the rechargeable batteries.

The protruding portion can have a plate shape or a hook shape.

The protruding portion of the first fixing member and the protruding portion of the second fixing member can be engaged with each other while interposing at least one of the balancing wires, and the balancing wires can be surrounded by the protruding portions.

The catching portion can include a plurality of first and second catching portions, and the first and second catching portions can be alternately disposed.

The first catching portion of the first fixing member and the second catching portion of the second fixing member can be positioned on the same line.

A protruding portion of the first catching portion of the first fixing member and a protruding portion of the second catching portion of the second fixing member can be arranged in a direction to face each other.

The connecting member can include a first connecting portion that is electrically coupled to the rechargeable batteries, and a second connecting portion that is bent toward a side surface of the rechargeable batteries from the first connecting portion to be connected to the balancing wire.

The catching portion can include a recess portion that is formed in a length direction of the rechargeable batteries, and the second connecting portion can be positioned in the recess portion.

The catching portion can include at least one catching recess, and the catching recess can be concavely formed in a direction away from the rechargeable batteries.

Another aspect is a battery pack comprising: a plurality of rechargeable batteries each having first and second terminals opposing each other; first and second fixing members each having a plurality of catching portions respectively positioned at opposite sides of the rechargeable batteries and extending toward a center of the rechargeable batteries, wherein each of the catching portions has first and second ends opposing each other, and wherein a gap is formed between the catching portions and the rechargeable batteries; a lower connecting member overlapping the first fixing member in the depth dimension of the battery pack and configured to electrically connect the first terminals of the rechargeable batteries to one another; an upper connecting member overlapping the second fixing member in the depth dimension of the battery pack and configured to electrically connect the second terminals of the rechargeable batteries to one another; a protective circuit configured to protect the rechargeable batteries from overcharge or overdischarge; and a plurality of balancing wires configured to electrically connect the lower and upper connecting members to the protective circuit, wherein the catching portions of the first fixing member and the respective catching portions of the second fixing member are engaged and fixed with respect to each other, and wherein one or more of the balancing wires pass through the gap.

In the above battery pack, each of the first and second fixing members has a body that has a plurality of insertion holes into which one sides of the rechargeable batteries are inserted, wherein the bodies have a plurality of catching holes formed between an edge of the body and the insertion holes, and wherein the catching portions are connected to at least two inner side walls of the catching holes.

In the above battery pack, each of the catching portions includes a recess portion formed in a length direction of the rechargeable batteries.

In the above battery pack, each of the upper and lower connecting members comprises a first connecting portion and a second connecting portion bent from the first connecting portion, wherein the second connecting portion is positioned in the recess portion.

In the above battery pack, one end of each catching portion has a protrusion that protrudes in a direction crossing a length direction of the rechargeable batteries.

In the above battery pack, the protrusion has a plate shape.

In another embodiment of the above battery pack, the protrusion can have a hook shape.

In the above battery pack, the protrusion of each catching portion of the first fixing member and the protrusion of each catching portion of the second fixing member are engaged with each other, wherein the balancing wires are surrounded by the protrusions.

In the above battery pack, the catching portions include a plurality of first and second catching portions, wherein the first and second catching portions are alternately disposed.

In the above battery pack, the first catching portions of the first fixing member and the second catching portions of the second fixing member are aligned with each other.

In the above battery pack, each of the first and second catching portions has a protrusion, wherein the protrusions are arranged to face each other.

In the above battery pack, the hole has a square shape, a circular shape, hexagonal shape or a polygonal shape.

In the above battery pack, the connecting member includes a first connecting portion electrically connected to the rechargeable batteries and a second connecting portion bent from the first connecting portion toward a side surface of the rechargeable batteries to be connected to a selected one of the balancing wires.

In the above battery pack, each of the catching portions includes a recess portion formed in a length direction of the rechargeable batteries, wherein the second connecting portion is positioned in the recess portion.

In the above battery pack, each of the catching portions includes at least one catching recess that is concavely formed in a direction away from the rechargeable batteries.

In the above battery pack, the catching recess accommodates two or more of the balancing wires.

Another aspect is a battery pack comprising: a plurality of rechargeable batteries each having first and second terminals opposing each other; first and second fixing members each having a plurality of catching portions respectively positioned at opposite sides of the rechargeable batteries, wherein each of the catching portions has first and second ends opposing each other, and wherein a gap is formed between the catching portions and the rechargeable batteries; and a plurality of balancing wires placed adjacent to the rechargeable batteries, wherein the catching portions of the first fixing member and the respective catching portions of the second fixing member are engaged and fixed with respect to each other, and wherein one or more of the balancing wires pass through the gap.

In the above battery pack, the catching portions are located between two of the rechargeable batteries and an edge of the first or second fixing member.

The above battery pack further comprises a circuit board placed adjacent to the rechargeable batteries, wherein the balancing wires are configured to electrically connect the circuit board and the rechargeable batteries.

Another aspect is a battery pack comprising: a plurality of rechargeable batteries each having first and second terminals opposing each other; first and second fixing members each having a plurality of catching portions respectively positioned at opposite sides of the rechargeable batteries, wherein each of the catching portions has first and second ends opposing each other, and wherein a gap is formed between the catching portions and the rechargeable batteries; and a plurality of balancing wires placed adjacent to the rechargeable batteries, wherein the catching portions of the first fixing member and the respective catching portions of the second fixing member are engaged and fixed with respect to each other, wherein one or more of the balancing wires pass through the gap, and wherein each of the catching portions includes a recess portion accommodating one or more of the balancing wires.

According to at least one of the disclosed embodiments, the balancing wires can be stably fixed to the battery pack without the separate fixing member.

DETAILED DESCRIPTION OF CERTAIN INVENTIVE EMBODIMENTS

Figure 1:
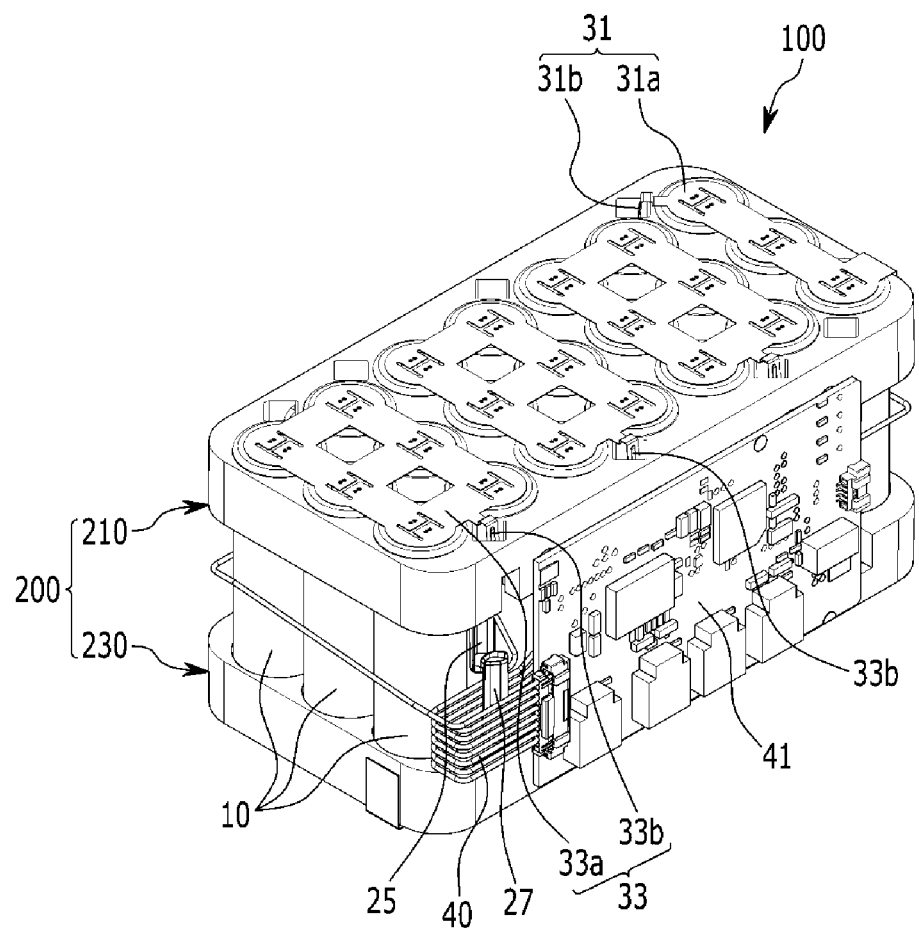
FIG. 1 is a schematic perspective view of a battery pack according to an exemplary embodiment.

Typically, since a plurality of balancing wires are positioned outside of a battery pack and have various lengths according to their positions, they need to be fixed to the battery pack.

The described technology will be described more fully hereinafter with reference to the accompanying drawings, in which exemplary embodiments are shown. As those skilled in the art would realize, the described embodiments can be modified in various different ways, all without departing from the spirit or scope of the described technology.

The drawings and description are to be regarded as illustrative in nature and not restrictive, and like reference numerals designate like elements throughout the specification.

Further, in the drawings, size and thickness of each element are arbitrarily illustrated for ease of description, and the described technology is not necessarily limited to such size and thickness illustrated in the drawings.

In the drawings, the thickness of layers, films, panels, regions, etc. are exaggerated for clarity. In addition, in the drawings, for ease of description, the thicknesses of some layers and regions are exaggerated. It will be understood that when an element such as a layer, film, region, or substrate is referred to as being "on" another element, it can be directly on the other element or intervening elements can also be present.

A rechargeable battery according to an exemplary embodiment will now be described in detail with reference to the attached drawings. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

Figure 2:
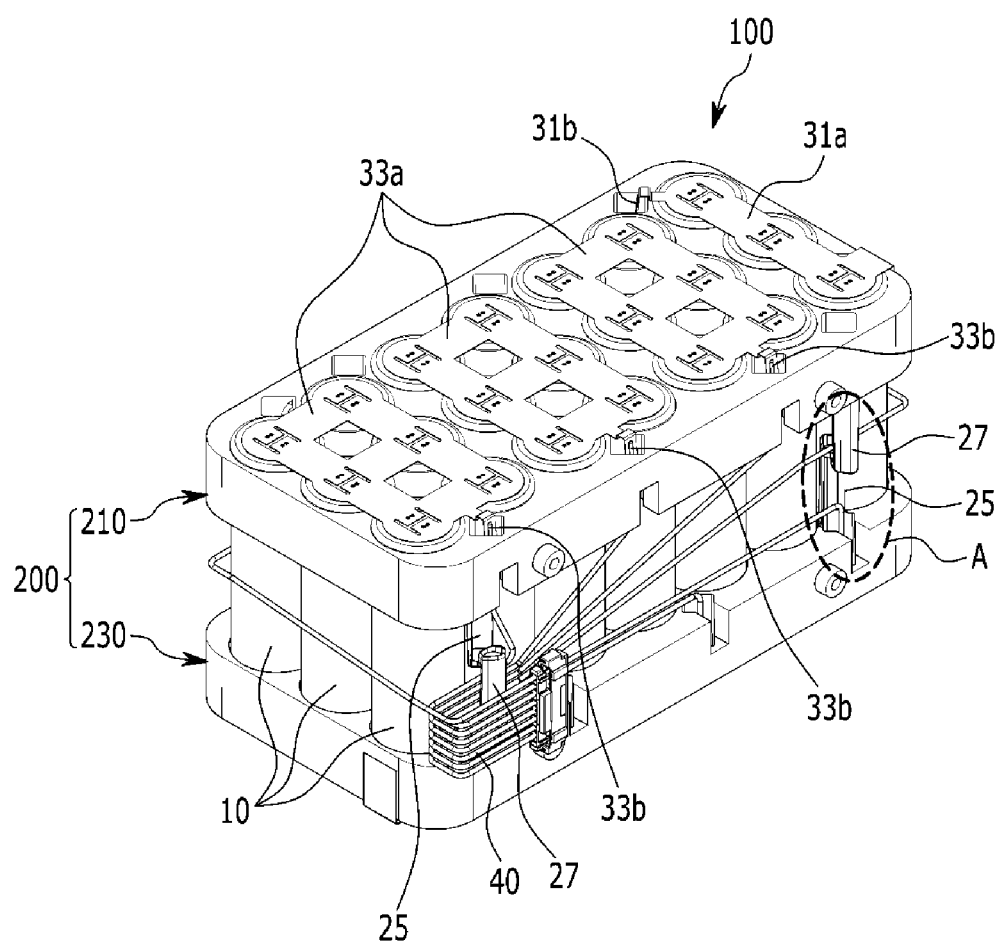
FIG. 2 is a schematic perspective view of the battery pack of FIG. 1 from which a protective circuit board is removed.
Figure 3:
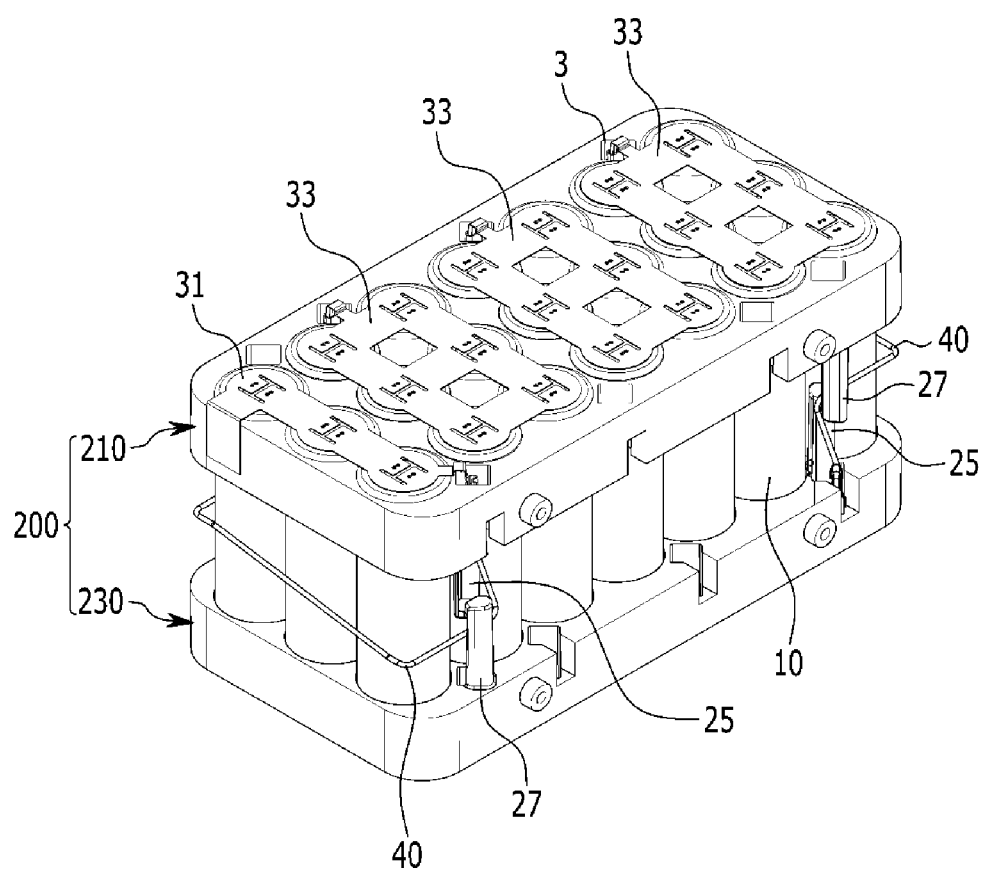
FIG. 3 is a schematic perspective view of another side of the battery pack of FIG. 2.
Figure 4:
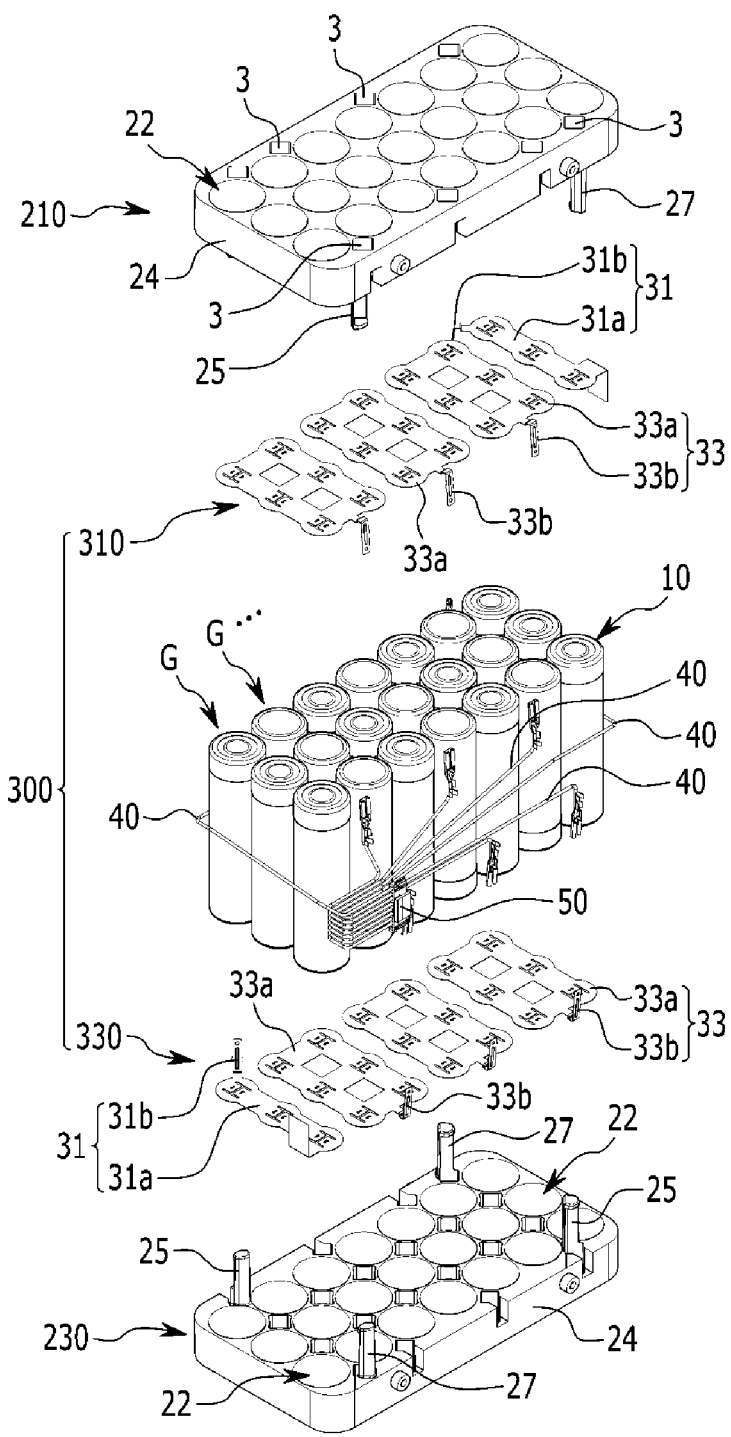
FIG. 4 is an exploded perspective view of the battery pack of FIG. 2.

FIG. 1 is a schematic perspective view of a battery pack 100 according to an exemplary embodiment. FIG. 2 is a schematic perspective view of the battery pack of FIG. 1 from which a protective circuit board is removed. FIG. 3 is a schematic perspective view of another side of the battery pack of FIG. 2. FIG. 4 is an exploded perspective view of the battery pack of FIG. 2.

As shown in FIGS. 1 to 4, the battery pack 100 includes a plurality of rechargeable batteries 10, a fixing member 200, a connecting member 300, and a plurality of balancing wires 40. The fixing member fixes the rechargeable batteries 10 in place. The connecting member 300 electrically connects the rechargeable batteries 10. The balancing wires 40 connect the connecting member 300 to a circuit board 41.

The rechargeable batteries 10 can respectively be a cylindrical type of batteries or a prismatic type of batteries (not shown), and can be fixed to the fixing member 200 after they are arranged in a matrix form.

The fixing member 200 can include a first fixing member 210 that fixes one side of the rechargeable batteries 10, and a second fixing member 230 facing the first fixing member 210 and fixes the other side of the rechargeable batteries 10. The rechargeable batteries 10 are interposed between the first and second fixing members 210 and 230.

The first fixing member 210 has a body 24 having an insertion hole 22 into which one side of the rechargeable battery 10 is inserted, and a plurality of first and second catching portions 25 and 27 that are connected to the body 24 and are extended in a direction toward the rechargeable batteries from the body 24. When the battery pack 100 is assembled, the first and second catching portions 25 and 27 are locked together to keep the battery pack 100 together.

The first catching portion 25 and the second catching portion 27 are formed to reduce a weight of the body 24 and are connected to a weight-reducing hole 3 (or catching hole 3) (see FIG. 3) that is formed in the body 24, and are extended from an inner side wall of the hole 3. The first and second catching portions 25 and 27 can have the same shape, with their different ends directed and connected to the body 24, so the first catching portion 25 will now be described as an example.

Figure 5:
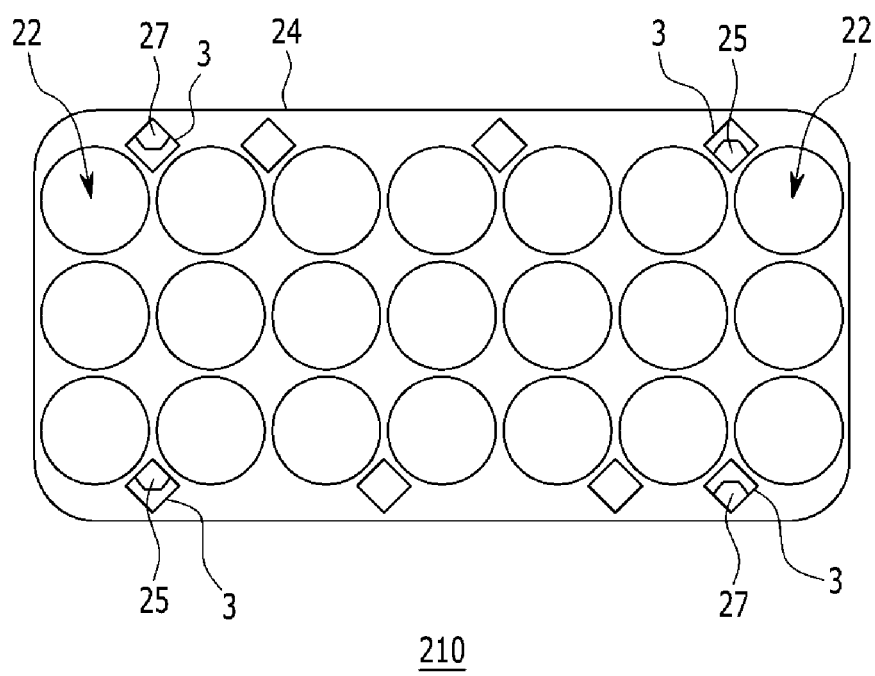
FIG. 5 is a top plan view of a first fixing member according to the exemplary embodiment.
Figure 6:
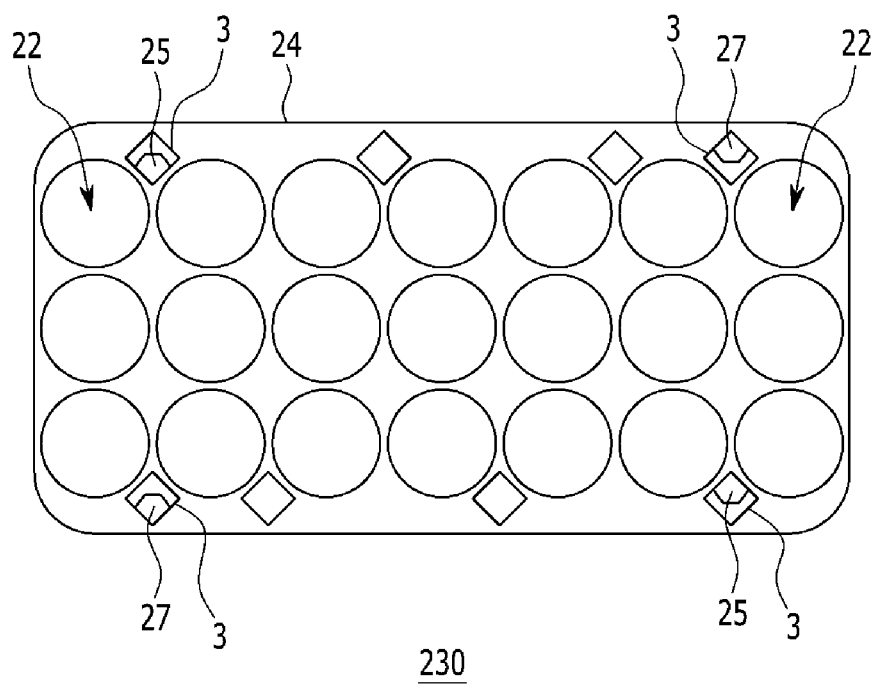
FIG. 6 is a top plan view of a second fixing member according to the exemplary embodiment.
Figure 7:
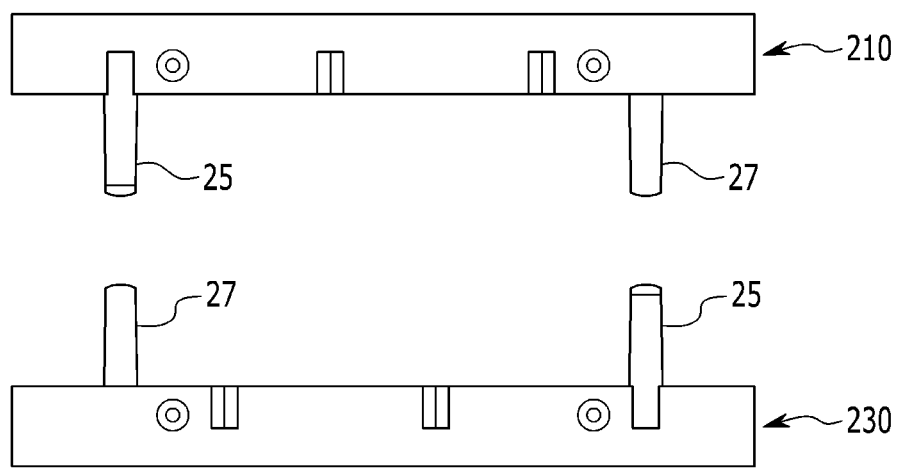
FIG. 7 is a front view of the first and second fixing members of FIGS. 5 and 6 after they are aligned.
Figure 8:
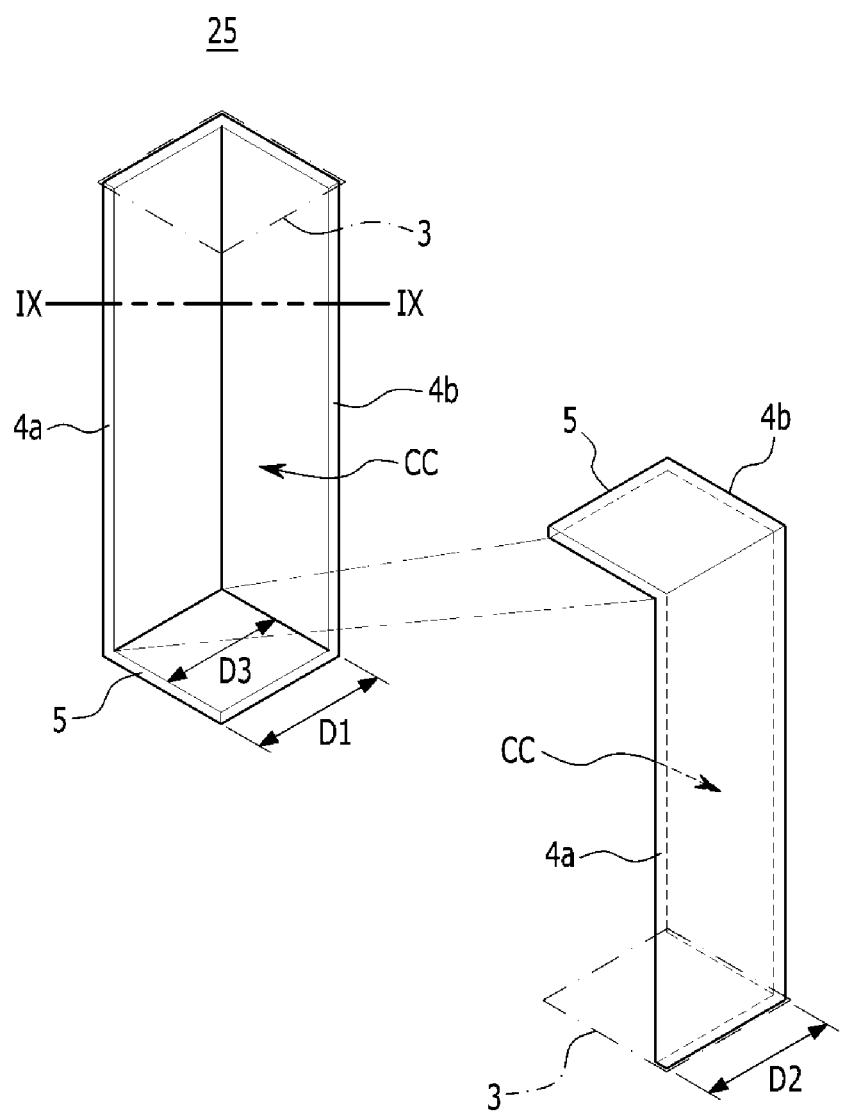
FIG. 8 is a schematic perspective view of first and second catching portions according the exemplary embodiment.

FIG. 5 is a top plan view of the first fixing member 210 of FIG. 1. FIG. 6 is a top plan view of the second fixing member 230 of FIG. 1. FIG. 7 is a front view of the first and second fixing members 210 and 230 of FIGS. 5 and 6 after they are aligned. FIG. 8 is a schematic perspective view of the first and second catching portions 210 and 230 of FIG. 1.

The hole 3 formed in the body 24 can have a circular, a planar shape or a polygonal planar shape with four sides or more. In addition, the first catching portion 25 can be connected to sides that form the hole 3.

Figure 9:
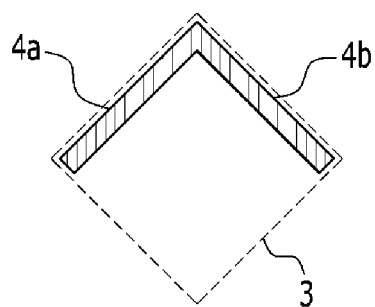
FIG. 9 is a cross-sectional view of FIG. 8 taken along the line IX-IX.

When the hole 3 has a polygonal planar shape such as a quadrangular shape, plate-shaped members 4a and 4b extended from neighboring sides of the sides forming the hole 3 can be, as shown in FIGS. 8 and 9, connected to each other while having a predetermined angle therebetween, thereby forming the first catching portion 25. In this case, the plate-shaped members 4a and 4b can be a rectangular shape with short sides which are the sides forming the hole 3, and the plate-shaped members 4a and 4b can be connected at an angle of less than 180°.

As described above, since the plate-shaped members are connected while having the predetermined angle therebetween, the first catching portion 25 is formed with a recess portion CC which is concave in a direction substantially perpendicular to long sides of the plate-shaped members. The recess portion CC can be formed to be extended along long sides of the first catching portion 25. In this case, a horizontal cross-section of the first catching portion 25 can be V-shaped as shown in FIG. 9.

The first catching portion 25 can further include a protruding portion or protrusion 5. For example, if one end of the first catching portion 25 not connected to the body 24 is defined as a free end, the protruding portion 5 is connected to the free end. The protruding portion 5 can protrude in a direction substantially perpendicular to a length direction of the first catching portion 25, and can have a plate shape.

Figure 10:
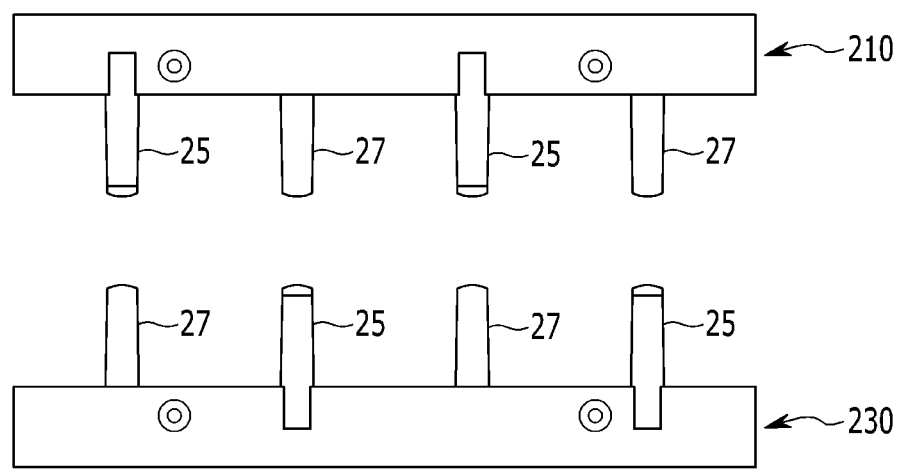
FIG. 10 is a front view of first and second fixing members according to another exemplary embodiment after they are aligned.

The first catching portion 25 and the second catching portion 27 can have recess portions CC, which are arranged in opposite directions and thus face each other. The first and second catching portions 25 and 27 can be disposed along a sidewall of the body 24 while having a predetermined gap therebetween. The first and second catching portions 25 and 27 can be alternately disposed as shown in FIG. 10.

In addition to the first fixing member 210, the second fixing member 230 can stably fix the other side of the rechargeable batteries, and can be formed to have a similar shape to the first fixing member 210.

For example, the second fixing member 230 includes a body 24 having an insertion hole 22 into which the other side of the rechargeable batteries is inserted, and a plurality of first and second catching portions 25 and 27 that are directed toward the rechargeable batteries from one end of the body 24 and are extended in a direction toward the rechargeable batteries from the body 24.

The first catching portion 25 of the second fixing member 230 can be positioned on the same line as the second catching portion 27 of the first fixing member 210, and the second catching portion 27 of the second fixing member 230 can be positioned on the same line as the first catching portion 25 of the first fixing member 210.

The protruding portions 5 of the first and second catching portions 25 and 27 can be connected to the body 24 while protruding in opposite directions with respect to each other. In these embodiments, when the first catching portion 25 of the first fixing member 210 and the second catching portion 27 of the second fixing member 230 are positioned on the same line, the protruding portions 5 thereof face each other.

In some embodiments, when the first fixing member 210 and the second fixing member 230 are used to fix the opposite sides of the rechargeable batteries while interposing the rechargeable batteries therebetween, the protruding portions of the first catching portions 25 of the first and second fixing members 210 and 230 and the protruding portions of the second catching portions 27 of the first and second fixing members 210 and 230 are engaged with respect to each other, thereby stably fixing the rechargeable batteries between the first fixing member and the second fixing member.

As described above, in order for the protruding portion of the first catching portion 25 and the protruding portion of the second catching portion 27 to be engaged and combined with each other, the first and second catching portions 25 and 27 can be extended to pass through a point corresponding to half the length of the rechargeable batteries.

In addition, the two protruding portions can have different sizes such that the plate-shaped protruding portion 5 of the first catching portion 25 is combined with the protruding portion 5 of the second catching portion 27 while contacting it. That is, the width D1 of the protruding portion 5 of the first catching portion 25 can be relatively greater or smaller than the width D2 of the protruding portion 5 of the second catching portion 27. When the width of the protruding portion 5 is formed such that it has the same width as one side of the hole, the inner width D3 can be reduced by a thickness of the plate-shaped member. In some embodiments, a terminal end of the protruding portion 5 does not reach to a bottom of the recess portion CC and thus only the protruding portion 5 can be partially combined. Accordingly, in consideration of the thickness of the plate-shaped member, one of the two protruding portions 5 can be formed to have a greater or smaller width than that of the other protruding portion, thereby maximizing a coupled area and thus increasing a coupling force therebetween.

Figure 11:
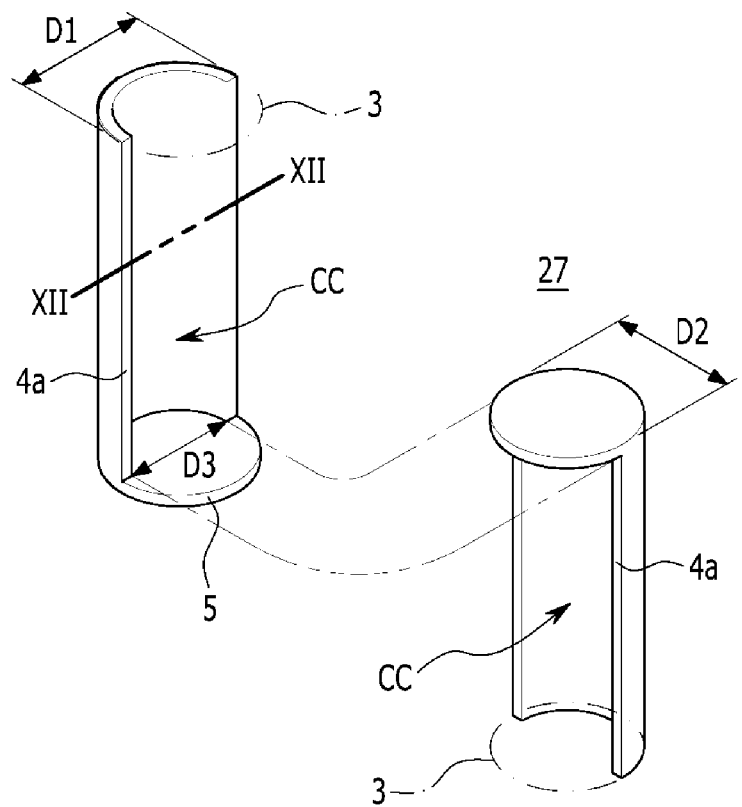
FIG. 11 is a schematic perspective view of first and second catching portions according to another exemplary embodiment.
Figure 12:
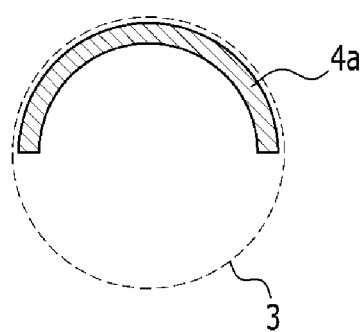
FIG. 12 is a cross-sectional view of FIG. 11 taken along the line XII-XII.
Figure 13:
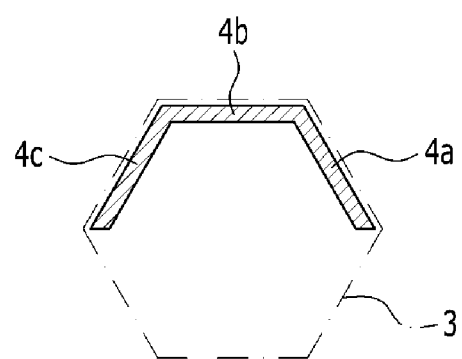
FIGS. 13 and 14 are horizontal cross-sectional views of first catching portions according to other exemplary embodiments.
Figure 14:
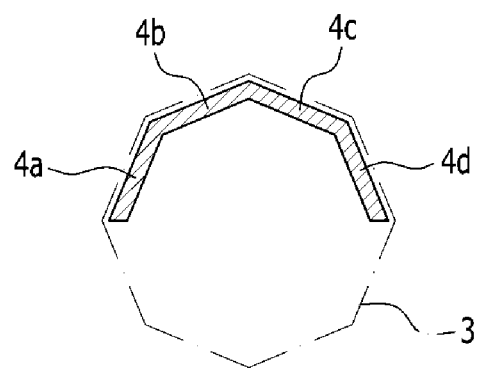

FIG. 11 is a schematic perspective view of first and second catching portions according to another exemplary embodiment. FIG. 12 is a cross-sectional view of FIG. 11 taken along the line XII-XII. FIGS. 13 and 14 are horizontal cross-sectional views of first catching portions according to other exemplary embodiments.

As shown in FIGS. 11 and 12, when a hole 3 has a circular planar shape, a first catching portion 25 can be extended from one side that has an arc shape. Since the hole 3 is circular, a semicircular recess portion CC can be formed in one plate-shaped member 4a.

The width D1 of a protruding portion 5 of the first catching portion 25 and the width D2 of a protruding portion 5 of the second catching portion 27 can be different from each other. For example, in consideration of a thickness of the plate-shaped member, the width D2 of the protruding portion 5 of the second catching portion 27 can be smaller than the inner width D3 of the protruding portion 5 of the first catching portion 25.

In addition, the hole 3 formed in a body can have a hexagonal shape as shown in FIG. 13 or an octagonal shape as shown in FIG. 14. As described above, when the polygonal hole 3 is formed and thus the number of sides forming the hole 3 increases, the number of plate-shaped members can also increase. Accordingly, the first and second catching portions 25 and 27 can be formed by connecting three plate-shaped members 4a, 4b, and 4c as shown in FIG. 13 or four plate-shaped members 4a, 4b, 4c, and 4d as shown in FIG. 14.

Figure 15:
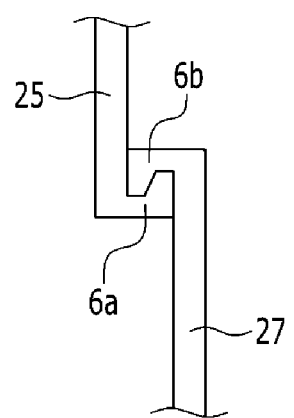
FIG. 15 is a cross-sectional view illustrating a state in which first and second catching portions according to another exemplary embodiment are combined.

FIG. 15 is a cross-sectional view illustrating a state in which first and second catching portions according to another exemplary embodiment are combined.

Since the first and second catching portions illustrated in FIG. 15 are substantially the same as the first and second catching portions illustrated in FIGS. 1 to 14, only differences will be described in detail.

As shown in FIG. 15, protruding portions 6a and 6b are respectively formed at one end of each of first and second catching portions 25 and 27 according to the current exemplary embodiment.

The protruding portions 6a and 6b can have a hook shape, and the protruding portion 6a of the first catching portion 25 and the protruding portion 6b of the second catching portion 27 have hook shapes that are bent in different directions. Accordingly, the protruding portion 6a of the first catching portion 25 and the protruding portion 6b of the second catching portion 27 can be more strongly coupled than the plate-shaped protruding portions 5 described above, since they are engaged and coupled with each other.

Referring back to FIGS. 1 to 5, the rechargeable batteries 10 can be electrically connected in series or in parallel via the connecting member 300 depending on battery capacity to be desirably obtained from the battery pack 100. For example, all of the rechargeable batteries can be connected in series or in parallel. In addition, unit batteries in which a plurality of rechargeable batteries are connected in parallel can be connected in series, or on the contrary, unit batteries in which a plurality of rechargeable batteries are connected in series can be connected in parallel.

Hereinafter, for ease of description, the rechargeable batteries disposed in one direction and having terminals of the same polarity disposed at one side are defined as a single unit battery (G). In FIG. 4, after grouping three rechargeable batteries into a single unit battery (G), a battery pack including 7 unit batteries are illustrated, but it is not limited thereto, and a larger or smaller number of rechargeable batteries and unit batteries can be included. In this case, the neighboring unit batteries are disposed such that they have opposite polarities with respect to each other.

The connecting member 300 can be disposed at opposite sides of the rechargeable batteries, and the connecting member 300 includes a lower connecting member 310 positioned on a first fixing member 210 and an upper connecting member 330 positioned on a second fixing member 230.

The lower connecting member 310 and the upper connecting member 330 respectively include one or more first connecting members 31 and one or more second connecting members 33.

The first connecting member 31 is provided to electrically couple terminals of the same polarity, and electrically couples the rechargeable batteries 10 that are included in the single unit battery (G). The second connecting member 33 is provided to electrically couple terminals of different polarities and to couple two neighboring unit batteries (G), and in this case, the terminals of different polarities are electrically coupled. The second connecting member 33 can connect a pair of first connecting members 31 via a plurality of bridges, but it is not limited thereto, and can be formed to have various planar shapes.

The first and second connecting members 31 and 33 respectively include first connecting portions 31a and 33a that directly contact the terminals of the rechargeable batteries, and second connecting portions 31b and 33b that are bent from the first connecting portions 31a and 33a in a direction toward a side surface of the rechargeable batteries to extend therefrom. The second connecting portions 31b and 33b can have smaller widths than a length of one side of each of the first connecting portions 31a and 33a, and can be integrally formed with the first connecting portions 31a and 33a. The connecting members 31 and 33 can be formed of a material having good conductivity such as nickel, aluminum, copper, or silver.

In this case, the second connecting portions 31b and 33b can be positioned in a recess portion CC of the first catching portion 25 or the second catching portion 27.

The first and second connecting members 31 and 33 can be connected to the terminals of the rechargeable batteries exposed by an insertion hole 22 of a fixing member 200 by welding.

A plurality of balancing wires 40 are provided to connect a protective circuit of a protective circuit board 41 to the rechargeable batteries, and one end of each balancing wire 40 can be electrically coupled to the protective circuit of the protective circuit board via a connector 50 while the other end thereof can be connected to the second connecting portions 31b and 33b of the connecting member 300.

The other end of the balancing wire 40 has an expansion (not shown) that is expanded to facilitate connection with the second connecting portions 31b and 33b. In addition, while the expansion contacts and overlaps the second connecting portions 31b and 33b, an edge of the expansion can be bent or wound toward a center of the second connecting portions 31b and 33b. As described above, when the edge of the expansion is formed to be wound, the second connecting portions 31b and 33b are pressed above the second connecting portions 31b and 33b such that the expansion of the balancing wire 40 and the second connecting portions 31b and 33b are further closely attached to each other, thereby reducing contact resistance therebetween.

The second connecting portions 31b and 33b can be positioned in the recess portion CC of the first catching portion 25 or the second catching portion 27. In this case, since the first catching portion 25 and the second catching portion 27 are formed of an insulating material and the second connecting portions 31b and 33b are enclosed by the recess portion CC, they can, after the second connecting portions 31b and 33b and the balancing wire 40 are connected, prevent the second connecting portions 31b and 33b from being electrically coupled to the rechargeable batteries.

On the other hand, since the battery pack 100 includes a plurality of first and second connecting members 31 and 33 depending on the number of the rechargeable batteries, the second connecting portions 31b and 33b are positioned in various regions of the battery pack 100.

On the contrary, since the protective circuit elements are attached to one side surface of the battery pack, each balancing wire 40 connecting each of the second connecting portions 31b and 33b to the protective circuit elements can have various lengths depending on positions of the second connecting portions 31b and 33b. In this case, depending on the positions of the second connecting portions 31b and 33b, the balancing wires 40 can be connected to the protective circuit elements after circling around a plurality of sides of the battery pack.

Figure 16:
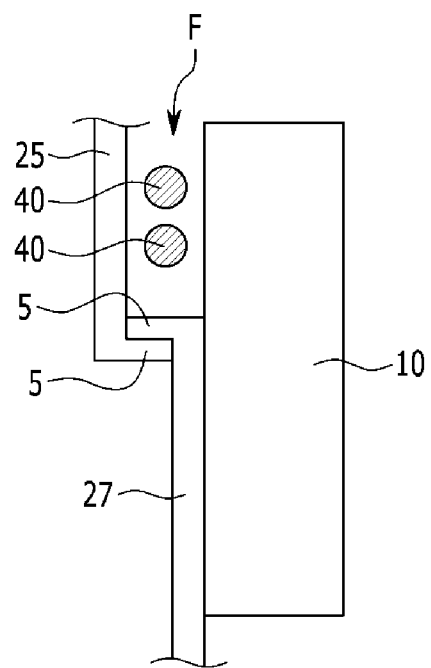
FIG. 16 is a schematic enlarged side view of portion A of FIG. 2.

FIG. 16 is a schematic enlarged side view of portion A of FIG. 2.

As shown in FIGS. 2, 3, and 16, when the protruding portions of the first and second catching portions 25 and 27 are engaged with each other such that the rechargeable batteries are fixed between the first fixing member and the second fixing member, a gap F is formed between the first catching portion 25 or the second catching portion 27 and the rechargeable batteries 10. A plurality of gaps F can be formed depending on the number of the first and second catching portions 25 and 27 that are formed.

On the other hand, a plurality of balancing wires 40 are provided to pass through the gap F, and the balancing wires 40 can pass through the gaps F depending on their positions. When the balancing wires 40 are provided to pass through the gap F, the balancing wires 40 can be surrounded by the first catching portion 25 and the rechargeable battery 10 or the second catching portion 27 and the rechargeable battery 10. Accordingly, the balancing wires 40 are confined within the gap F, and are positioned within only a predetermined region outside of the battery pack 100.

When the balancing wires 40 are provided to pass through the gap F as in the current exemplary embodiment, the balancing wires 40 can be aligned and arranged with a position of the gap F while not being distributed in a disorderly fashion outside of the battery pack. Accordingly, when the balancing wires 40 are provided, the balancing wires 40 can become less tangled. In addition, a separate fixing member for fixing the balancing wires 40 of respective different lengths to prevent them from being moved may not be used.

Referring back to FIG. 1, the protective circuit board 41 is electrically coupled to the balancing wires 40 via the connector 50. The protective circuit board 41 includes a circuit for controlling a current or a voltage when the rechargeable batteries 10 are overcharged or over-discharged, and can prevent damage, such as explosion or the like due to charging/discharging abnormality of the rechargeable battery 10, from occurring.

FIGS. 17 to 20 are schematic views of first catching portions, second catching portions, and balancing wires according to the other exemplary embodiments after they are aligned.

Since a battery pack of FIGS. 17 to 20 is substantially the same as the battery pack of FIGS. 1 to 16, only differences will be described in detail. FIGS. 17 to 20 are enlarged views of portion A of FIG. 2.

Figure 17:
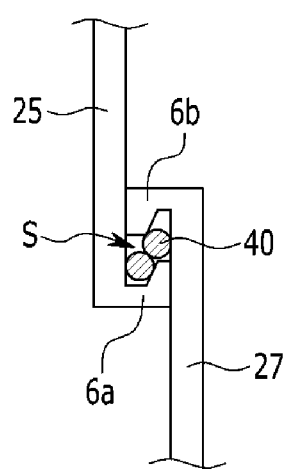
FIGS. 17, 18, 19 and 20 are schematic views of first catching portions, second catching portions, and balancing wires according to the other exemplary embodiments after they are aligned.

First and second catching portions 25 and 27 illustrated in FIG. 17 can have the protruding portions 6a and 6b illustrated in FIG. 15. The protruding portion 6a of the first catching portion 25 and the protruding portion 6a of the second catching portion 27 have hook shapes to be engaged with each other while being separated by a predetermined distance.

Accordingly, a fixing hole S surrounded by the two protruding portions 6a and 6b is formed between the two protruding portions 6a and 6b. In addition, balancing wires 40 can be provided to pass through the fixing hole S.

As described above, when the balancing wires 40 are provided to pass through the fixing hole S, the balancing wires 40 are confined within the fixing hole S. In this case, the fixing hole S can be varied depending on a size of the protruding portion, and the hook can be differently sized in consideration of the size and the like of the balancing wires 40 to be passed through.

Since the size of the fixing hole S can be smaller than the gap F described above, the balancing wires can be further tightly fixed.

Figure 18:
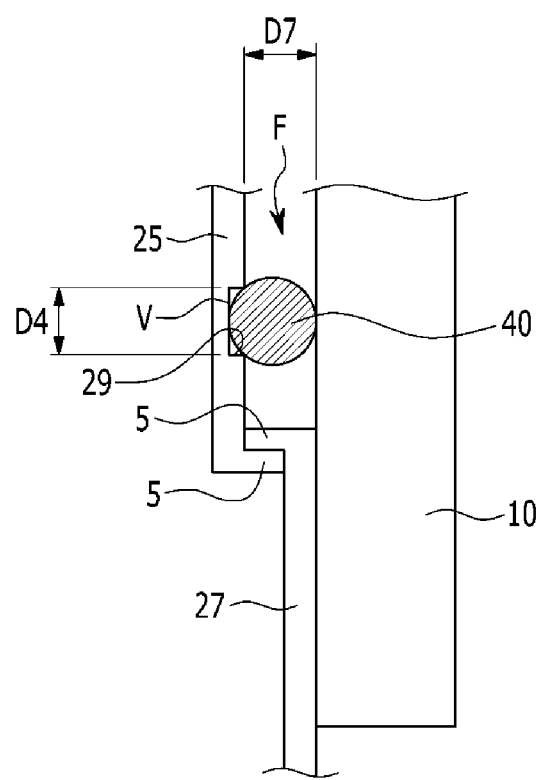
Figure 19:
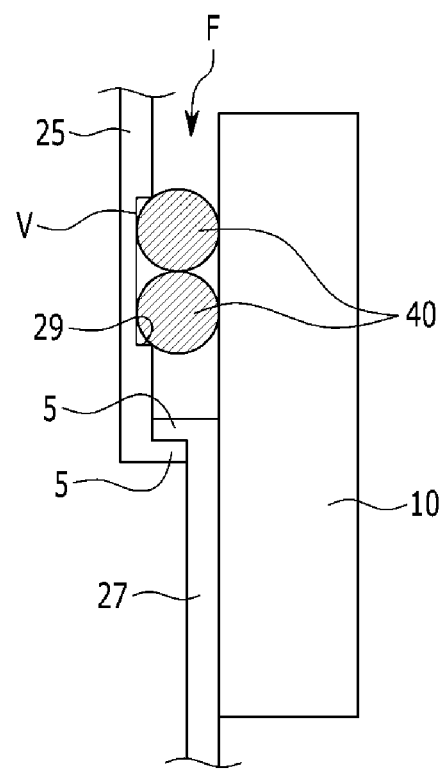
Figure 20:
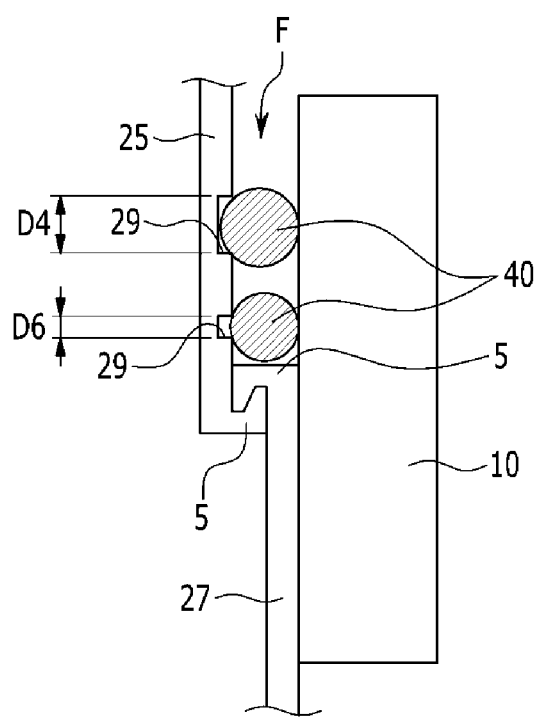

As shown in FIGS. 18 to 20, the first catching portion 25 can have one or more catching recesses V, and the second catching portion 27 can also have one or more catching recesses (not shown).

As shown in FIG. 18, the width D4 of the catching recess V can be smaller than the diameter of the balancing wire 40 such that one balancing wire 40 is caught by the catching recess V and is then fixed thereto.

Alternatively, as shown in FIG. 19, the catching recess V can be formed to be extended along a length direction of the first catching portion such that the balancing wires 40 are caught by the catching recess V and are then fixed thereto.

Alternatively, as shown in FIG. 20, the catching recess V can be formed to have different widths D5 and D6 depending on diameters of the balancing wires 40.

As shown in FIGS. 18 to 20, when the catching recess V is formed in the first catching portion 25, since the balancing wires 40 are partially inserted into the catching recess V, the balancing wires 40 can be prevented from being moved within the gap F, thereby more stably fixing the balancing wires 40.

In addition, since the balancing wires 40 are partially inserted into the catching recess V of the first catching portion 25, a gap D7 between the rechargeable battery 10 and the first catching portion 25 can be reduced.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery pack comprising:
    a plurality of rechargeable batteries each having first and second terminals opposing each other;
    first and second fixing members each having a plurality of catching portions respectively positioned at opposite sides of the rechargeable batteries and extending toward a center of the rechargeable batteries, wherein each of the catching portions has first and second ends opposing each other, and wherein a gap is formed between the catching portions and the rechargeable batteries;
    a lower connecting member overlapping the first fixing member in the depth dimension of the battery pack and configured to electrically connect the first terminals of the rechargeable batteries to one another;
    an upper connecting member overlapping the second fixing member in the depth dimension of the battery pack and configured to electrically connect the second terminals of the rechargeable batteries to one another;
    a protective circuit configured to protect the rechargeable batteries from overcharge or overdischarge; and
    a plurality of balancing wires configured to electrically connect the lower and upper connecting members to the protective circuit, wherein the catching portions of the first fixing member and the respective catching portions of the second fixing member are engaged and fixed with respect to each other, and wherein one or more of the balancing wires pass through the gap.

2. The battery pack of claim 1, wherein each of the first and second fixing members has a body that has a plurality of insertion holes into which one sides of the rechargeable batteries are inserted, wherein the bodies have a plurality of catching holes formed between an edge of the body and the insertion holes, and wherein the catching portions are connected to at least two inner side walls of the catching holes.

3. The battery pack of claim 2, wherein each of the catching portions includes a recess portion formed in a length direction of the rechargeable batteries.

4. The battery pack of claim 3, wherein each of the upper and lower connecting members comprises a first connecting portion and a second connecting portion bent from the first connecting portion, and wherein the second connecting portion is positioned in the recess portion.

5. The battery pack of claim 2, wherein one end of each catching portion has a protrusion that protrudes in a direction crossing a length direction of the rechargeable batteries.

6. The battery pack of claim 5, wherein the protrusion has a plate shape.

7. The battery pack of claim 5, wherein the protrusion has a hook shape.

8. The battery pack of claim 7, wherein the protrusion of each catching portion of the first fixing member and the protrusion of each catching portion of the second fixing member are engaged with each other, and wherein the balancing wires are surrounded by the protrusions.

9. The battery pack of claim 2, wherein the catching portions include a plurality of first and second catching portions, and wherein the first and second catching portions are alternately disposed.

10. The battery pack of claim 9, wherein the first catching portions of the first fixing member and the second catching portions of the second fixing member are aligned with each other.

11. The battery pack of claim 10, wherein each of the first and second catching portions has a protrusion, and wherein the protrusions are arranged to face each other.

12. The battery pack of claim 2, wherein the hole has a square shape, a circular shape, hexagonal shape or a polygonal shape.

13. The battery pack of claim 1, wherein the connecting member includes a first connecting portion electrically connected to the rechargeable batteries and a second connecting portion bent from the first connecting portion toward a side surface of the rechargeable batteries to be connected to a selected one of the balancing wires.

14. The battery pack of claim 13, wherein each of the catching portions includes a recess portion formed in a length direction of the rechargeable batteries, and wherein the second connecting portion is positioned in the recess portion.

15. The battery pack of claim 1, wherein each of the catching portions includes at least one catching recess that is concavely formed in a direction away from the rechargeable batteries.

16. The battery pack of claim 15, wherein the catching recess accommodates two or more of the balancing wires.

17. A battery pack comprising:
    a plurality of rechargeable batteries each having first and second terminals opposing each other;
    first and second fixing members each having a plurality of catching portions respectively positioned at opposite sides of the rechargeable batteries, wherein each of the catching portions has first and second ends opposing each other, and wherein a gap is formed between the catching portions and the rechargeable batteries; and a plurality of balancing wires placed adjacent to the rechargeable batteries, wherein the catching portions of the first fixing member and the respective catching portions of the second fixing member are engaged and fixed with respect to each other, and wherein one or more of the balancing wires pass through the gap.

18. The battery pack of claim 17, wherein the catching portions are located between two of the rechargeable batteries and an edge of the first or second fixing member.

19. The battery pack of claim 17, further comprising a circuit board placed adjacent to the rechargeable batteries, wherein the balancing wires are configured to electrically connect the circuit board and the rechargeable batteries.

20. A battery pack comprising:
a plurality of rechargeable batteries each having first and second terminals opposing each other;
first and second fixing members each having a plurality of catching portions respectively positioned at opposite sides of the rechargeable batteries, wherein each of the catching portions has first and second ends opposing each other, and wherein a gap is formed between the catching portions and the rechargeable batteries; and
a plurality of balancing wires placed adjacent to the rechargeable batteries, wherein the catching portions of the first fixing member and the respective catching portions of the second fixing member are engaged and fixed with respect to each other, wherein one or more of the balancing wires pass through the gap, and wherein each of the catching portions includes a recess portion accommodating one or more of the balancing wires.

* * * * *